United States Patent [19]

Matsuyama et al.

[11] Patent Number: 5,196,672
[45] Date of Patent: Mar. 23, 1993

[54] LASER PROCESSING ARRANGEMENT

[75] Inventors: Hidenobu Matsuyama; Kimihiro Shibata; Hiroki Sakamoto, all of Kanagawa, Japan

[73] Assignee: Nissan Motor Co., Ltd., Yokohama, Japan

[21] Appl. No.: 840,545

[22] Filed: Feb. 25, 1992

[30] Foreign Application Priority Data

Feb. 28, 1991 [JP] Japan ............................. 3-34508

[51] Int. Cl.⁵ .......................................... B23K 26/02
[52] U.S. Cl. ......................... 219/121.83; 219/121.62; 219/121.78; 219/121.82
[58] Field of Search ................... 219/121.83, 121.82, 219/121.62, 121.78

[56] References Cited

U.S. PATENT DOCUMENTS 4,825,035 4/1989 Moriyasu et al. ............... 219/121.61
4,908,493 3/1990 Susemihl ......................... 219/121.67

FOREIGN PATENT DOCUMENTS 63-190115 8/1988 Japan .
4-28487 1/1992 Japan .

*Primary Examiner*—C. L. Albritton
*Attorney, Agent, or Firm*—Foley & Lardner

[57] ABSTRACT

A laser processing arrangement includes a laser oscillator which outputs a laser beam. The laser beam path is established such that the beam reflects from a flat surfaced mirror to a concave mirror and then to a second concave mirror before irradiating a work piece under processing. The arrangement further includes a temperature sensor associated with a temperature detecting means. The temperature detecting means is connected to a control unit which controls moving means connected to movable axes of a processing surface in order to move the work piece relative the laser beam. The control unit is further effective to control the laser oscillator according to a desired temperature range for processing. The temperature sensor is preferably positioned within 45° of the laser beam and the angle of incidence of the laser beam is selected so as to be smaller than a brewster angle of the material of the work piece.

5 Claims, 4 Drawing Sheets

LASER PROCESSING ARRANGEMENT

BACKGROUND OF THE INVENTION

1. Field of the Invention

The present invention relates generally to a processing arrangement utilizing laser beams. Particularly, the present invention relates to a laser processing arrangement which can accurately sense a temperature of a material being irradiated by a laser beam for accurate adjustment thereof to prevent defective processing operation.

2. Description of the Prior Art

Laser processing arrangements are known in the art which utilized laser beams and temperature sensors for processing of work pieces of various types of material. One such laser processing arrangement is exemplified by Japanese Patent Application, first publication (unexamined) 63-190115. Referring to FIG. 4, this laser processing arrangement 101 includes a laser oscillator 102 which outputs a laser beam 103, a reflecting mirror 105 from which the laser beam 103 is reflected to a collimating lens 105. Numeral 106 represents a work piece to be processed by the arrangement. The prior art arrangement further includes a sensor 107 associated with a temperature detecting means 108 for detecting a temperature in the vicinity of the work piece. The temperature detecting means 108 is associated with a control unit 109 for effecting automatic control of the laser oscillator 102.

Furthermore, the work piece 106 is positioned on a processing table 110 which is rotatably movable on a lengthwise horizontal axis by a first servo motor 111 and a width horizontal axis by a second servo motor 112. The first and second servo motors 111 and 112 are controlled by the control unit 109 for moving the work piece 106 relative the laser beam 103.

However, in some cases, a surface reflectivity of the work piece 106 is enough to prevent sufficient heating of the work piece 106 during processing. In such cases, it is necessary to include a laser absorbing layer 113 (such as a graphite based material for example) to insure sufficient heating of the work piece 106.

It has been observed by the inventors of the present invention, that a vibratory field including a P component parallel to the plane of incidence and an S component perpendicular to the plane of incidence develops in laser processing, these components may be utilized to stabilize a laser irradiation process according to a set direction of incidence which. This process is disclosed in Japanese Patent Application No. 2-132291. However in order to utilize the above principles a high accuracy is required in sensing an actual surface temperature of an irradiated area of the work piece 106. However, since, in many cases, a laser absorbing layer 113 is employed during processing, accurate monitoring of an actual surface temperature is not possible and stable laser processing is inhibited.

SUMMARY OF THE INVENTION

It is therefore a principal object of the present invention to provide a laser processing arrangement in which a surface temperature of a work piece is directly sensed for determining a desirable working temperature range to effect stable laser processing without occurrence of unwanted burning or melting of the work piece.

In order to accomplish the aforementioned and other objects, a laser processing arrangement according to the present invention comprises: a laser oscillator, the laser oscillator outputting a polarized laser beam therefrom, the laser beam incident upon an optical system for aiming the laser beam to irradiate a material to be processed; a processing surface, for retaining the material, which surface is movable relative the laser beam; drive means for moving the processing surface; temperature detecting means including a sensor for detecting a temperature of an irradiated portion of the material; and control means, associated with the laser oscillator, the drive means and the temperature detecting means, for controlling at least one of the laser oscillator output and/or a moving speed of the processing surface relative the beam, in response to the detected temperature, the material being positioned relative the laser beam such that a plane of polarization of the laser beam is parallel to a plane of incidence thereof, the irradiated portion of the material being irradiated by the laser beam at a predetermined angle less than a brewster angle of the material.

DESCRIPTION OF THE PREFERRED EMBODIMENT

Figure 1:
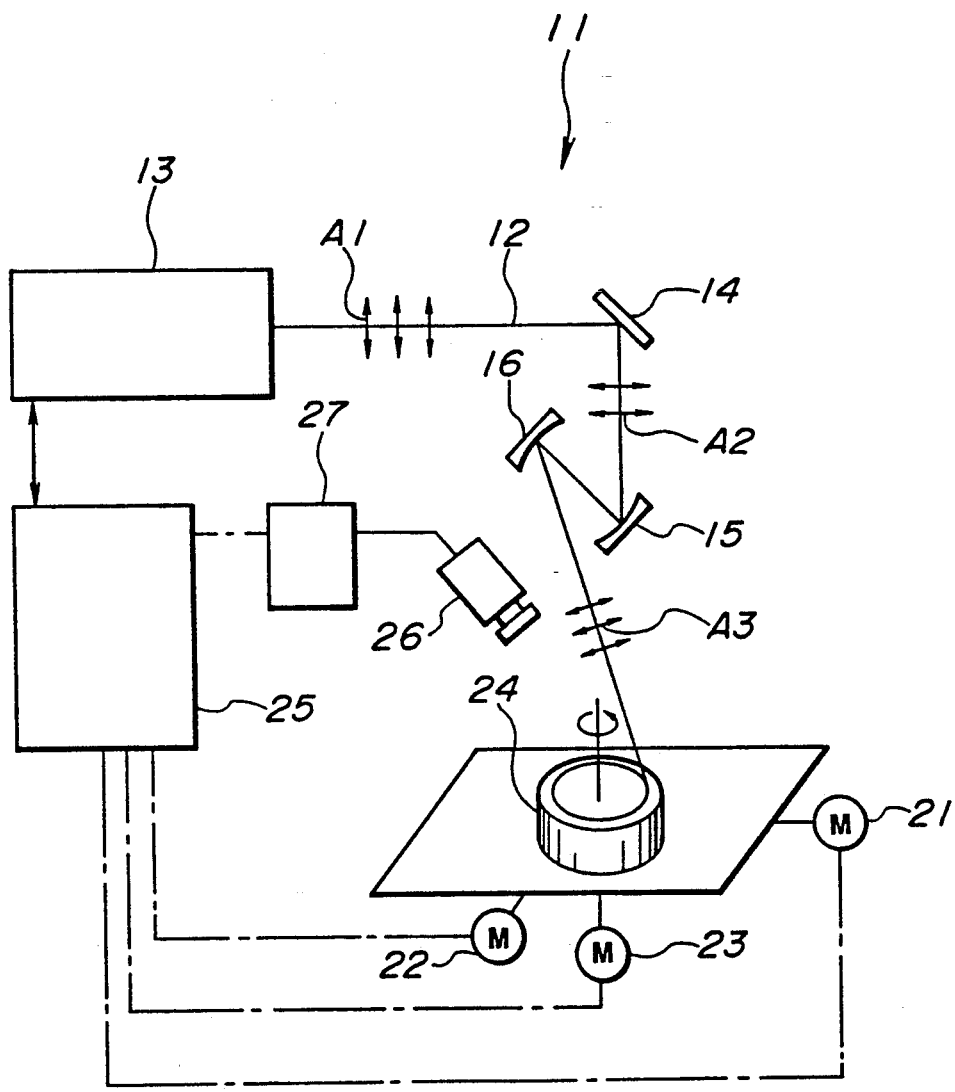
FIG. 1 is a schematic diagram of a first embodiment of a laser processing arrangement according to the present invention.

Referring now to the drawings, particularly to FIG. 1, a laser processing apparatus 11 includes a laser oscillator 13 which outputs a laser beam 12. The laser beam 12 is reflected by a stationary, flat surfaced mirror 14 to a pair of stationary concave mirrors 15, 16. The mirror 14 and concave mirrors 15, 16 form an optical system in which the plane of polarization of the laser beam 12 is parallel to the plane of incidence and, the laser incident angle when irradiating the work piece 23 undergoing processing is less than the brewster angle of the material of the work piece 23.

Further, the laser processing arrangement 11 includes a processing table 17. The processing table 17 is rotatably movable on its horizontal axis of width by a driving means 21, such as a servo motor for example, and is further rotatably movable on its horizontal longitudinal axis by a second driving means 22 and also rotatably movable on a vertical axis by a third driving means 23. The driving means 21, 22, 23 are respectively connected to a laser processing control unit 25, which automatically controls positioning of the work piece 24 thereby. Thus the work piece 23 is movable relative the laser beam 12.

Numeral 26 designates a temperature sensor portion of a temperature detecting means 27, for sensing a temperature of a surface portion of the process goods under irradiation by the laser beam 12 and detecting infrared rays emanating therefrom. The temperature sensor portion 26 is preferably positioned within 45° of the portion of the work piece 24 undergoing irradiation. It will be noted that the positioning of the sensor portion 26 relative the laser beam 12 does not change.

The temperature detecting means 27 is interposed between the sensor portion 26 and the processing control unit 25. Further, the processing control unit 25 is connected to the laser oscillator 13 for carrying out automatic control of the laser beam 12.

In FIG. 1, arrow groupings A1, A2 and A3, respectively indicate the direction of the polarization plane of the laser beam 12 at respective areas along the beam path.

Referring again to FIG. 1, the laser oscillator 13 emits the laser beam 12 in the direction of the flat surfaced mirror 14 at which point the beam direction is changed to a direction toward the first concave mirror 15 and from there to the direction of the second concave mirror 16. From the second concave mirror 16 the laser beam 12 is then irradiated onto a portion of the work piece 24. By this process a laser absorption coefficient is raised to its highest level when it reaches the work piece 24 and the plane of polarization of the work piece 24 is parallel to the plane of incidence.

At this point, if the work piece 24 is of carbon steel, for example, at an incident angle of between 70° and 80°, more than 60% of the laser absorption coefficient may be achieved. Thus, according to the present invention for laser burning procedures, for example, a laser absorption layer is not required. Therefore the temperature detector 26 can directly sense the temperature of a surface onto which the laser beam 12 irradiates, thus improving the accuracy of temperature measurement.

Thus, when the surface, or dimension of the work piece 24 is to be changed, the preferred temperature range may be set in the laser control unit 25 in advance (for example, if working a material such as austenite, the laser temperature range may be set to a temperature above a temperature necessary for working of the austenite but below the melting point thereof). Thus, if temperature variation occurs during working of the work piece 24, the control unit 25 can optimally control the laser oscillator 13 to maintain an optimum working temperature.

In addition, the laser output adjustment may further include operation such that the control unit 25 controls the moving means, such as a servo motor 23, for example, so as to rotate the work piece 24 on one of its movable axes so as to move the work piece 24 relative the laser beam 12 so as to effect working of the work piece 24 in a desired manner while controlling the moving speed to prevent build-up of temperatures beyond a selected temperature range.

Figure 2:
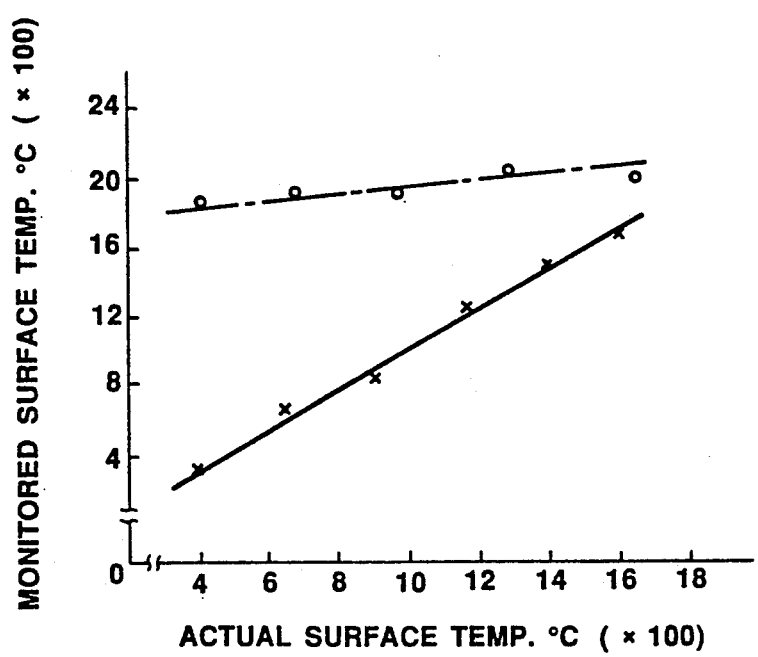
FIG. 2 is a graph comparing a monitored surface temperature with an actual surface temperature of a work piece according to the conventional arrangement and according to the arrangement of the present invention.

FIG. 2 shows a comparison of the temperature monitoring of the present invention with that of the prior art. As can be seen by the broken line in FIG. 2, in the prior art, utilizing a laser absorption layer, a great discrepancy exists between a monitored surface temperature and an actual surface temperature of a work piece 24 undergoing irradiation. On the other hand, as shown by a solid line in FIG. 2, the surface temperature as monitored by the system of the invention substantially corresponds to an actual surface temperature, thus working accuracy is improved.

Figure 3:
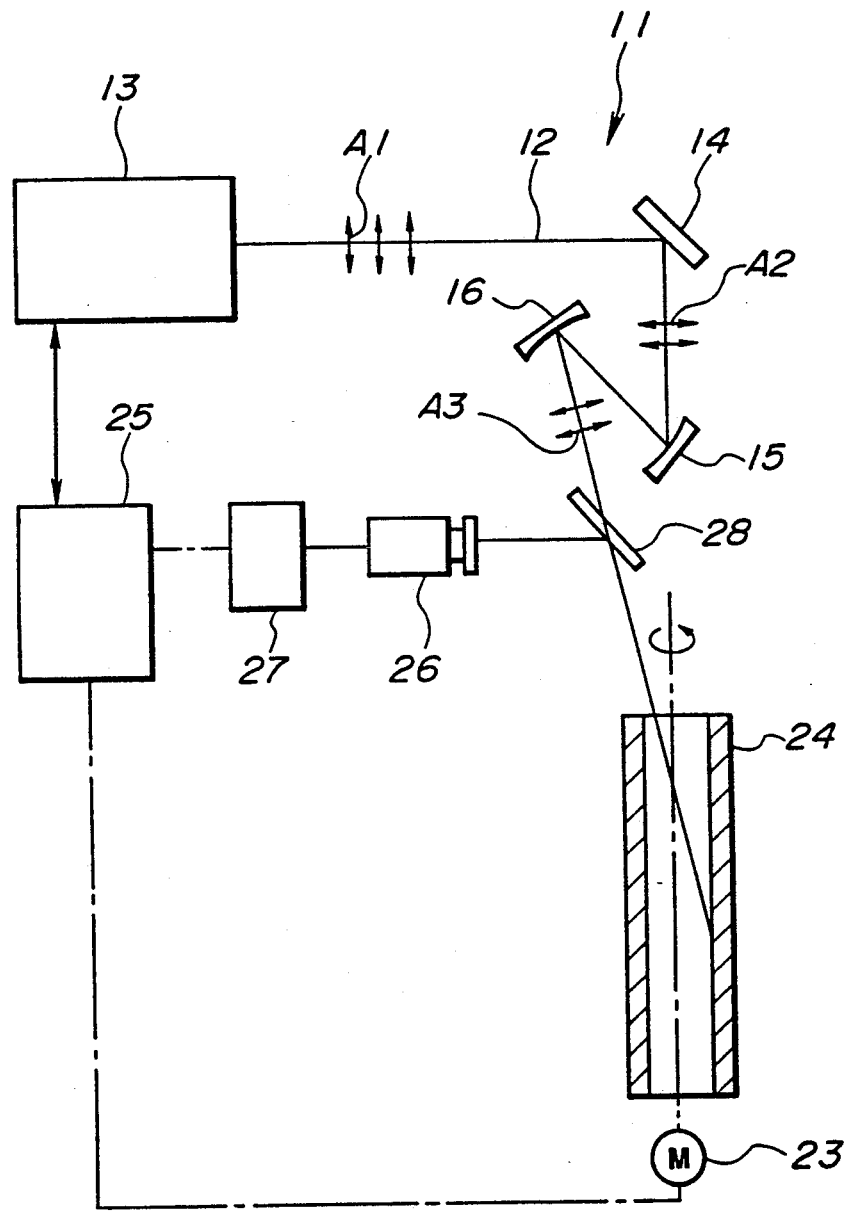
FIG. 3 is a schematic diagram of a second embodiment of a laser processing arrangement according to the present invention.
Figure 4:
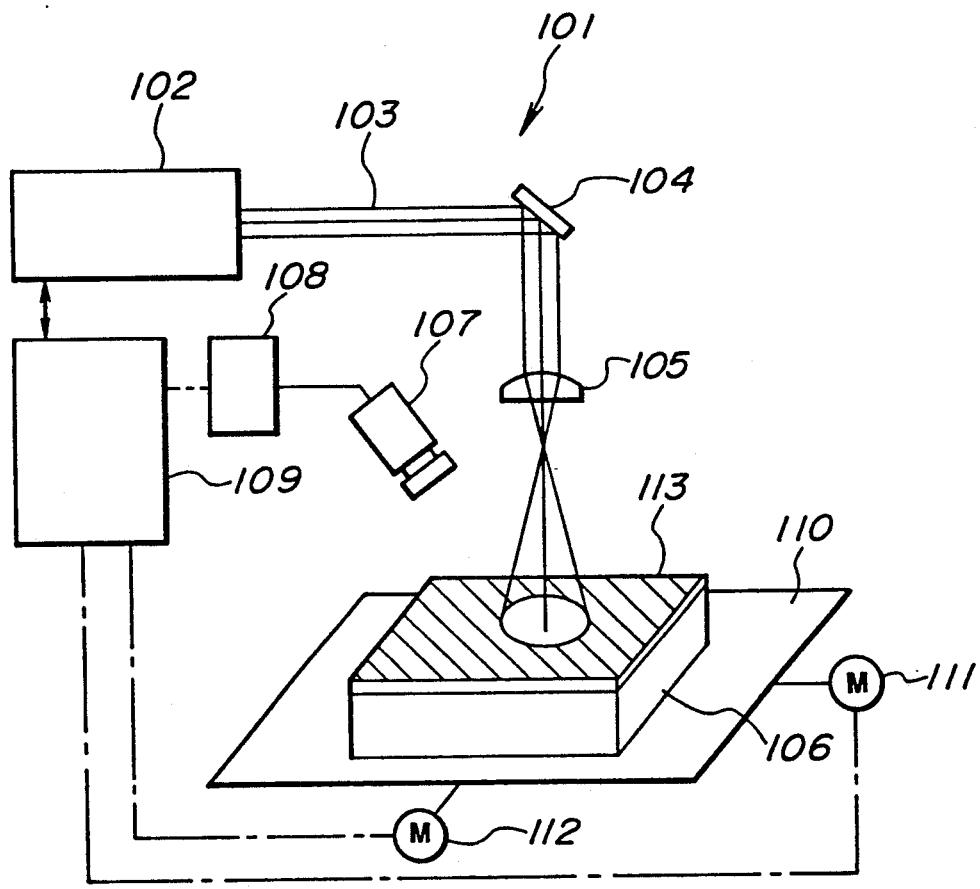
FIG. 4 is a schematic diagram of a conventional laser processing arrangement.

In FIG. 3 an alternative embodiment of a laser processing arrangement according to the present invention is shown. In this embodiment, along the path of the laser beam 12 a beam splitter 28 is arranged. The beam splitter 28 reflects a portion of the laser beam 12 to the temperature detection sensor 26 to carry out detection of the surface temperature according to a wavelength of the laser and a wavelength used for the purpose of detecting the surface temperature (for example, for working a work piece of Si, a wavelength of 0.9 $\mu$m may optimally be set).

According to the above arrangement, it is possible to determine the optimal temperature range for the working of a particular material in advance, according to the type of material and the wavelength of the beam 12. In other respects the second embodiment is substantially similar to the above-described first embodiment.

Thus, in a laser processing arrangement according to the present invention, irradiation of a work piece may be controlled via accurate temperature detection of a irradiated portion of the work piece and by positioning of the work piece such that the incident angle of the laser beam is less than the brewster angle of the material of the work piece in an optical system in which the plane of polarization of the laser beam is opposite parallel to the plan of incidence.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A laser processing arrangement, comprising:
   a laser oscillator, said laser oscillator outputting a polarized laser beam therefrom, said laser beam incident upon an optical system for aiming said laser beam to irradiate a material to be processed;
   a processing surface, for retaining said material, which surface is movable relative said laser beam;
   drive means for moving said processing surface;
   temperature detecting means including a sensor for detecting a temperature of an irradiated portion of said material; and
   control means, associated with said laser oscillator, said drive means and said temperature detecting means, for controlling at least one of the laser oscillator output and/or a moving speed of said processing surface relative said beam, in response to said detected temperature, said material being positioned relative said laser beam such that a plane of polarization of said laser beam is parallel to a plane of incidence thereof, said irradiated portion of said material being irradiated by said laser beam at a predetermined angle less than a brewster angle of said material.

2. A laser processing arrangement as set forth in claim 1, wherein said temperature detecting means is positioned within 45° of a portion of said laser beam which irradiates said material.

3. A laser processing arrangement as set forth in claim 1, wherein said optical system comprises a flat surfaced polarized mirror positioned facing a first concave mirror, which reflects said laser beam to a second concave mirror facing a position of material to be processed.

4. A laser processing arrangement as set forth in claim 1, further including a beam splitter said sensor portion of said temperature detecting means receiving one beam from said beam splitter, another beam from said beam splitter irradiating said material, said control unit determining a surface temperature of said irradiated portion of said material based on a wavelength of said laser and a wavelength selected for optimally determining a surface temperature of the material of said workpiece.

5. A laser processing arrangement as set forth in claim 1, wherein said moving means includes a first servo motor actuating a first movable axis of said processing surface, a second servo motor actuating a second movable axis of said processing surface and, a third servo motor actuating a third movable axis of said processing surface.

* * * * *